(12) United States Patent
Kim et al.

(10) Patent No.: US 11,182,374 B2
(45) Date of Patent: Nov. 23, 2021

(54) STANDARD PARTS MANAGEMENT SYSTEM AND METHOD

(71) Applicant: LG CHEM, LTD., Seoul (KR)

(72) Inventors: Doyul Kim, Daejeon (KR); Jae Chan Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 10 days.

(21) Appl. No.: 16/636,721

(22) PCT Filed: Aug. 9, 2018

(86) PCT No.: PCT/KR2018/009070
§ 371 (c)(1),
(2) Date: Feb. 5, 2020

(87) PCT Pub. No.: WO2019/035598
PCT Pub. Date: Feb. 21, 2019

(65) Prior Publication Data
US 2020/0242101 A1    Jul. 30, 2020

(30) Foreign Application Priority Data

Aug. 18, 2017 (KR) ........................ 10-2017-0104800

(51) Int. Cl.
*G06F 16/00* (2019.01)
*G06F 16/23* (2019.01)
*G06F 16/28* (2019.01)
*G06F 16/21* (2019.01)

(52) U.S. Cl.
CPC ........ *G06F 16/2358* (2019.01); *G06F 16/219* (2019.01); *G06F 16/2365* (2019.01); *G06F 16/285* (2019.01)

(58) Field of Classification Search
CPC .............. G06F 11/1461; G06F 2111/02; G06F 2111/04; G06F 21/552; G06F 21/577;
(Continued)

(56) References Cited

U.S. PATENT DOCUMENTS

| 9,165,041 B2 | 10/2015 | Matsui et al. |
| 10,496,251 B2 | 12/2019 | Adachi |
| 2001/0023376 A1 | 9/2001 | Uchida et al. |
| 2007/0143756 A1* | 6/2007 | Gokhale ............. G06F 11/1461 718/100 |

FOREIGN PATENT DOCUMENTS

| JP | 9-179892 A | 7/1997 |
| JP | 2001-14021 A | 1/2001 |

(Continued)

OTHER PUBLICATIONS

International Search Report (PCT/ISA/210) issued in PCT/KR2018/009070, dated Nov. 27, 2018.

*Primary Examiner* — Shyue Jiunn Hwa
(74) *Attorney, Agent, or Firm* — Birch, Stewart, Kolasch & Birch, LLP (57) ABSTRACT

Discussed are various embodiments of a system and a method of managing a standard component, and more particularly, a system and a method of managing a standard component, which are capable of periodically updating a plurality of standard components in order to intensively use a small number of good components in a component group including a plurality of standard components, and measuring and managing a number of the plurality of standard components.

10 Claims, 5 Drawing Sheets

(58) Field of Classification Search
CPC ........ G06F 21/604; G06F 30/00; G06F 30/17; G06F 16/27; G06F 16/34; G06F 16/951; G06F 21/6227; G06F 8/00; G06F 8/60; G06F 16/2379; G06F 21/31; G06F 21/316; G06F 21/32; G06F 21/445; G06F 21/45; G06F 21/53; G06F 21/57; G06F 21/575; G06F 21/6218; G06F 21/6245; G06F 21/64; G06F 2221/2129; G06F 2221/2149; G06F 2209/463; G06F 3/00; G06F 9/46; G06F 9/465; G06F 9/541
See application file for complete search history.

(56) References Cited

U.S. PATENT DOCUMENTS

| | | |
|---|---|---|
| 2014/0115509 A1 | 4/2014 | Deng et al. |
| 2017/0357935 A1* | 12/2017 | Fabjanski ............ G06N 3/0481 |

FOREIGN PATENT DOCUMENTS

| | | |
|---|---|---|
| JP | 2001-265838 A | 9/2001 |
| JP | 2011-215715 A | 10/2011 |
| JP | 2012-206734 A | 10/2012 |
| JP | 2017-76320 A | 4/2017 |
| KR | 10-1045017 B1 | 6/2011 |
| KR | 10-2014-0097838 A | 8/2014 |
| KR | 10-1476806 B1 | 1/2015 |
| KR | 10-2016-0041388 A | 4/2016 |

* cited by examiner

STANDARD PARTS MANAGEMENT SYSTEM AND METHOD

TECHNICAL FIELD

This application claims priority to and the benefit of Korean Patent Application No. 10-2017-0104800 filed in the Korean Intellectual Property Office on Aug. 18, 2017, the entire contents of which are incorporated herein by reference.

The present invention relates to a system and a method of managing a standard component, and more particularly, to a system and a method of managing a standard component, which are capable of periodically updating a plurality of standard components in order to intensively use the small number of good components in a component group including a plurality of standard components, and measuring and managing the number of plurality of standard components.

BACKGROUND ART

In general, in the case where a plurality of components of various kinds is used, in order to more efficiently use and manage the components, a component group is formed by grouping the same kind of components or similar components, or the components, which are easily usable and manageable together, into one group, and the plurality of components is managed and used by using the formed component group.

In this case, in the plurality of components of various kinds, which is grouped into the component group and is used, standard components verified through a standard evaluation are used for easy management and usage in a lump, and the verified standard components need to represent a component group.

In the meantime, in the standard components, the small number of good components is intensively used, so that it is necessary to periodically update the standard component and continuously manage the number of components. However, in the case of a system for managing a standard component in the related art, one or more standard components included in a component group may be periodically updated, but there is a problem in that it is impossible to manage the number of components for updating the standard component. Further, the system for managing a standard component in the related art has a problem in that, when an issue is generated in a currently used standard component and it is impossible to update the standard component any longer, it is impossible to replace the standard component.

In this respect, in order to solve the problems of the system for managing a standard component in the related art, the present inventors developed a standard component managing system, which is capable of determining the minimum number of standard components included in a component group and deleting and adding a standard component in order to meet the determined minimum number of standard components.

DETAILED DESCRIPTION OF THE INVENTION

Technical Problem

The present invention is conceived to solve the foregoing problems, and the present invention provides a system and a method of managing a standard component, which manage a standard component included in a component group including one or more standard components, and calculate the frequency of use of one or more standard components, compare the reference number of components with the number of one or more standard components included in a component group at every update time of the one or more standard components, and delete one or more standard components included in the component group or add one or more standard components to the component group based on the comparison result and the frequency of use to meet the minimum number of standard components set for each component group.

Technical Solution

An exemplary embodiment of the present invention provides a system for managing a standard component, which manages a component group including one or more standard components, the system including: a frequency calculating unit, which calculates a frequency of use of the one or more standard components; and a component management unit, which compares a reference number of components with the number of one or more standard components included in the component group for every update time of the one or more standard components, and deletes the one or more standard components included in the component group or add the one or more standard components to the component group based on a result of the comparison and the calculated frequency of use.

In the exemplary embodiment, the system may further include: a main database (main DB), which stores and manages information about the one or more standard components included in the component group; and a substitute database (sub DB), which stores and manages information about one or more components includable in the component group.

In the exemplary embodiment, when the number of one or more standard components included in the component group is less than the reference number of components, the component management unit may set any one or more components among the one or more components as standard components, and transfer information about the one or more set components stored in the sub DB to the main DB.

In the exemplary embodiment, the frequency calculating unit may calculate a frequency of utilization for development of each of the one or more components, and when the number of one or more standard components included in the component group is less than the reference number of components, the component management unit may sequentially set the components as standard components from the component having a higher order of the calculated frequency of utilization for development.

In the exemplary embodiment, when the number of one or more standard components included in the component group is larger than the reference number of components, the component management unit may delete any one or more components among the one or more standard components and transfer information about the one or more deleted standard components stored in the main DB to the sub DB.

In the exemplary embodiment, when the number of one or more standard components included in the component group is larger than the reference number of components, the component management unit may sequentially delete the standard components from the standard component having a lower order of the calculated frequency of use.

In the exemplary embodiment, when issue information about the one or more standard components included in the component group is obtained, the component management unit may delete the one or more standard components, about which the issue information is obtained, regardless of the comparison result and the calculated frequency of use.

Another exemplary embodiment of the present invention provides a method of managing one or more standard components included in a component group by using a standard component management system, the method including: calculating a frequency, in which a frequency of use of the one or more standard components is calculated; comparing component numbers, in which the reference number of components is compared with the number of one or more standard components included in the component group for every update time of the one or more standard components; and managing a component, in which the one or more standard components included in the component group are deleted or the one or more standard components are added to the component group based on a result of the comparison and the calculated frequency of use.

In the exemplary embodiment, the method may further include: storing and managing information about the one or more standard components included in the component group in a main database (main DB); and storing information about one or more components includable in the component group in a substitute database (sub DB) and managing the information about the one or more components.

In the exemplary embodiment, the managing of the component may include, when the number of one or more standard components included in the component group is less than the reference number of components, setting any one or more components among the one or more components as standard components, and the storing of the information in the sub DB and the managing of the information may include transferring information about the one or more set components stored in the sub DB to the main DB.

In the exemplary embodiment, the calculating of the frequency may include calculating a frequency of utilization for development of each of the one or more components, and the managing of the component may further include, when the number of one or more standard components included in the component group is less than the reference number of components, sequentially setting components from a component having a higher order of the calculated frequency of utilization for development as standard components.

In the exemplary embodiment, the managing of the component may include, when the number of one or more standard components included in the component group is larger than the reference number of components, deleting any one or more standard components among the one or more standard components, and the storing of the information in the main DB and the managing of the information may include transferring information about the one or more deleted standard components stored in the main DB to the sub DB.

In the exemplary embodiment, the managing of the component may further include, when the number of one or more standard components included in the component group is larger than the reference number of components, sequentially deleting the standard components from the standard component having a lower order of the calculated frequency of use.

In the exemplary embodiment, the managing of the component may include, when issue information about the one or more standard components included in the component group is obtained, the managing of the component may include deleting the one or more standard components, about which the issue information is obtained, regardless of the comparison result and the calculated frequency of use.

Advantageous Effects

The system for managing a standard component included in a component group including one or more standard components calculates the frequency of use of one or more standard components, compares the reference number of components with the number of one or more standard components included in a component group for every update time of one or more standard components, and deletes one or more standard components included in the component group or adds one or more standard components to the component group based on a result of the comparison and the frequency of use, thereby meeting the minimum number of standard components set for each component group.

BEST MODE

Hereinafter, an exemplary embodiment is presented for helping understanding of the present invention. However, the exemplary embodiment below is simply provided for easier understanding of the present invention, and the contents of the present invention are not limited by the exemplary embodiment.

Figure 1:
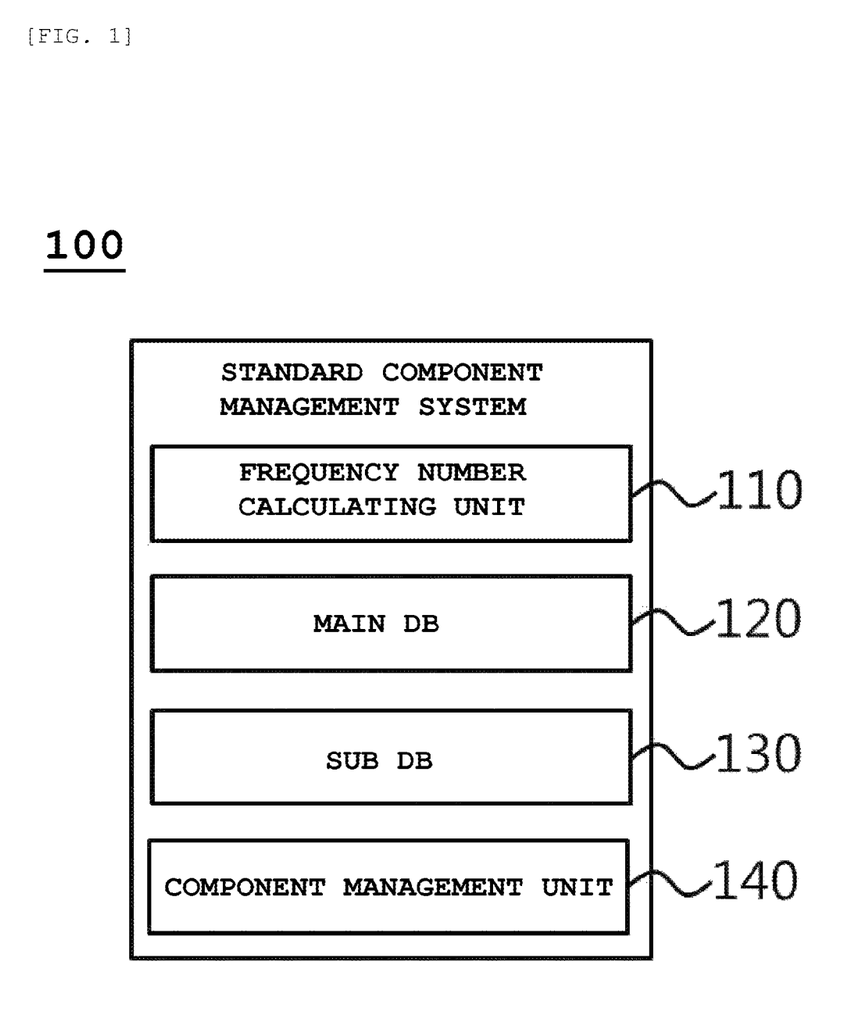
FIGS. 1 and 2 are diagrams schematically illustrating constituent elements of a standard component managing system 100 according to an exemplary embodiment of the present invention.
Figure 2:
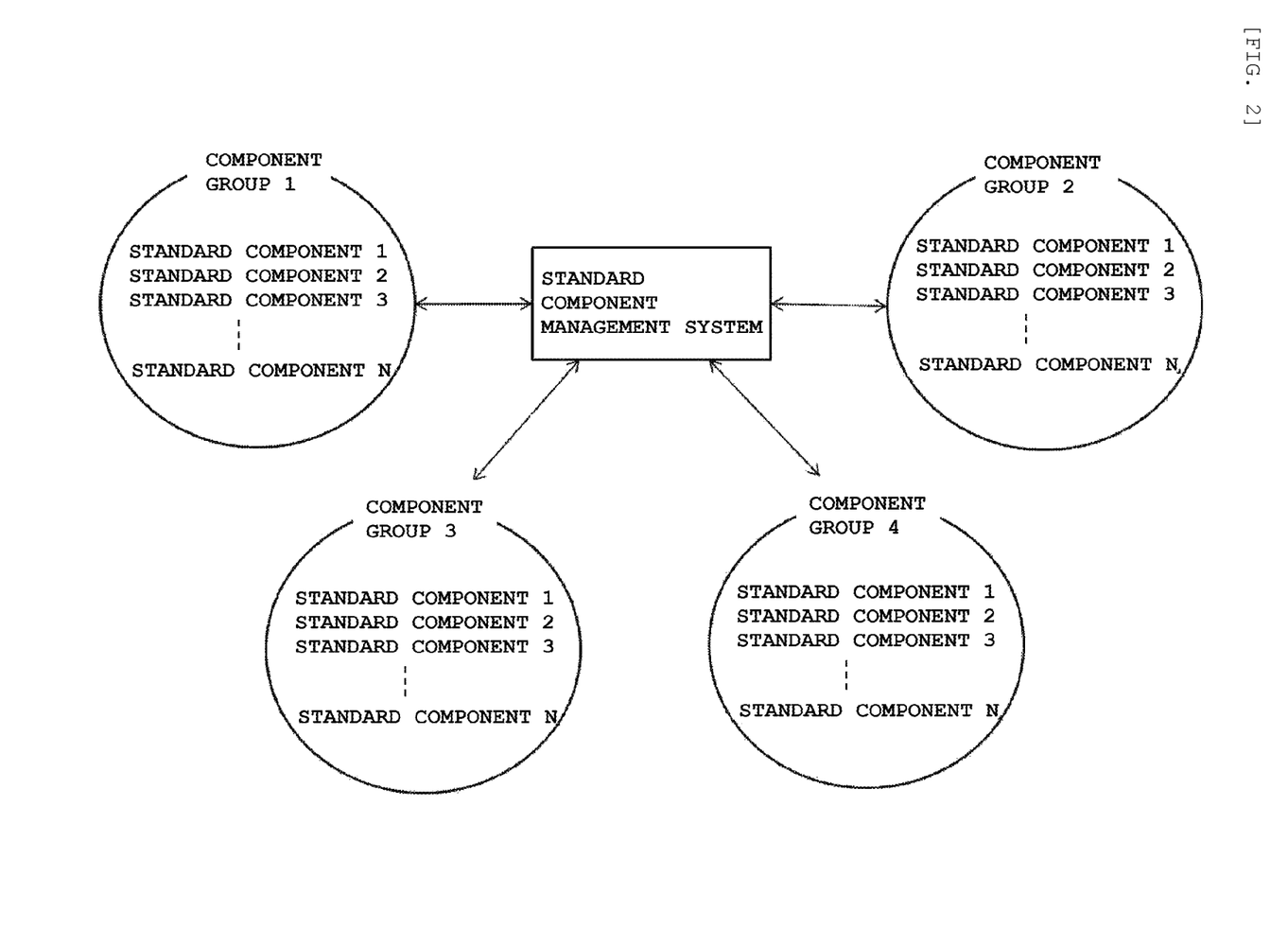

FIGS. 1 and 2 are diagrams schematically illustrating constituent elements of a standard component managing system 100 according to an exemplary embodiment of the present invention.

Referring to FIGS. 1 and 2, the standard component managing system 100 according to an exemplary embodiment of the present invention includes a frequency calculating unit (or a frequency calculator) 110, a main database (main DB) 120, a substitute database (sub DB) 130, and a component management unit (or a component manager) 140.

The standard component management system 100 illustrated in FIGS. 1 and 2, is an exemplary embodiment, and the constituent elements of the standard component management system 100 are not limited to the exemplary embodiment illustrated in FIGS. 1 and 2, and may be replaced, added, changed, or deleted as necessary. For example, the main DB 120 and the sub DB 130 in the standard component managing system 100 according to an exemplary embodiment of the present invention may be configured as one database unit, and information may be divided and stored in a plurality of databases included in the database unit.

First, the frequency calculating unit 110 may calculate a frequency of use of one or more standard components.

Herein, the standard component may mean a component meeting a specific reference among one or more components. For example, the standard component may be a component manufactured to comply with a standard of a specific nation, such as US standard, among one or more components.

In the exemplary embodiment, the frequency calculating unit 110 may calculate the frequency of use of one or more standard components for a predetermined period of time.

Herein, the predetermined period of time may be a value set by a user and a manufacturer of the standard component managing system 100 according to an exemplary embodiment of the present invention in order to measure a frequency of use of one or more standard components, and the frequency of use may mean the number of times of use of the one or more standard components for the predetermined period of time. For example, when the predetermined period of time is 60 seconds, and standard component A is used once for every 10 seconds, the frequency calculating unit 110 may calculate the frequency of use of standard component A as 6.

In the exemplary embodiment, the frequency calculating unit 110 may measure a use period of one or more standard components, of which the frequency of use is desired to be measured, and set the largest use period value among the measured use periods as a period of time for measuring the frequency of use. For example, when use periods of standard components A to C are 10 seconds, 15 seconds, and 30 seconds, respectively, and the use period value of 10 seconds of standard component A, of which the frequency of use is the smallest, is set to a period of time for measuring the frequency of use, all of the frequencies of use of standard components B and C may be equally measured to 0. Accordingly, the frequency calculating unit 110 may measure the frequency of use by setting the use period of standard component C, which is the largest, among standard components A to C as a reference.

In another exemplary embodiment, the frequency calculating unit 110 may set a common multiple of the use period of one or more standard components as a period of time for measuring the frequency of use. For example, when use periods of standard components A to C are 10 seconds, 20 seconds, and 30 seconds, respectively, and a predetermined period of time is 30 seconds, the frequencies of use of standard components A to C are 3, 1, and 1, respectively, and the frequencies of use of standard components B and C may be calculated as the same value. In this case, the frequency calculating unit 110 may set 60 seconds, which is a common multiple of 10 seconds, 20 seconds, and 30 seconds, as a period of time for measuring the frequency of use, and the frequencies of use of standard components A to C may be calculated as 6, 3, and 2.

In still another exemplary embodiment, the frequency calculating unit 110 may continuously measure the frequency of use up to an update time of one or more standard components without setting a period of time for measuring the frequency of use of the standard component.

The frequency calculating unit 110 may calculate a frequency of development utilization of each of the one or more components.

Herein, the component may mean a component which meets a specific reference, but is not included in a component group. For example, one or more components may be components replaceable with the standard component, which is included in the component group and used.

Further, the frequency of development utilization may mean the frequency, by which one or more components meeting a specific reference are utilized for development. For example, one or more components do not belong to a specific component group, but may be used for a development operation performed in the specific component group as necessary. The frequency calculating unit 110 may calculate a development utilization frequency by measuring the number of times, by which one or more components are used for a development operation, and provide the calculated development utilization frequency to the component management unit 140, which is to be described below.

The main DB 120 may store and manage information about one or more standard components included in the component group.

Herein, the information about the standard component may mean information for identifying the standard component. For example, the information about the standard component may include any one or more of the kind, a model name, a specification, a product code, an update time, and a frequency of use of the standard component, an issue history generated in the standard component, discontinuousness history, and new model release information.

The main DB 120 stores only the information about one or more standard components included in the component group, so that the component management unit 140, which is to be described below, may intensively manage only one or more standard components.

In the exemplary embodiment, the main DB 120 may include one or more databases so as to correspond to one or more component groups, and when information about one or more standard components included in the specific component group is desired to be obtained, it is possible to receive information about one or more standard components included in the specific component group from the database corresponding to the specific component group.

The sub DB 130 may store and manage information about one or more components, which are includable in the component group.

Herein, the one or more components may mean components, which meet a specific reference, but are not included in the component group as described above, and the information about one or more components may include any one or more of the kind, a model name, a specification, a product code, and an update time of the component, an issue history generated in the component, discontinuousness history, new model release information, and a frequency of use and a frequency of utilization for development of the component.

The component management unit 140 may compare the reference number of components with the number of one or more standard components included in the component group for every update time of one or more standard components.

Herein, the reference number of components may mean a maximum value of the number of standard components includable in one component group by a manufacture or a user of the standard component managing system 100 according to an exemplary embodiment of the present invention.

The component management unit 140 may delete one or more standard components included in the component group or add one or more standard components to the component group based on a result of the comparison of the number of components. More particularly, when the number of standard components included in the component group is less than the reference number of components, the component management unit 140 may set one or more components as standard components until the number of one or more standard components reaches the reference number of components, and add one or more standard components. Further, the component management unit 140 may transfer information about the component set as the standard component from the sub DB 130 to the main DB 120. For example, when the number of standard components included in the component group is 10 and the reference number of components is 15, the component management unit 140 may set five components as the standard components. Further, the component management unit 140 may transfer information about the five components set as the standard components from the sub DB 130 to the main DB 120, and thus, it is possible to collectively manage the existing standard components included in the component group and the newly set standard components.

In the exemplary embodiment, the component management unit 140 may select a component set as the standard component among one or more components based on the frequency of use. For example, when the frequencies of use of components A to D are 3, 1, 5, and 10, respectively, an order of the components set as the standard component is an order of component D, component C, component A, and component B. Herein, when only three components are required, the component management unit 140 may set component D, component C, and component A as the standard components based on a higher order of the frequency of use.

In the exemplary embodiment, when the number of one or more standard components included in the component group is less than the reference number of components, the component management unit 140 may sequentially set the components as the standard components from the component having a higher order of the frequency of utilization for development of one or more components. For example, when the frequencies of utilization for development of components A to D are 3, 2, 1, and 0, the components may be set as the standard components in an order of component A, component B, component C, and component D.

In the exemplary embodiment, the component management unit 140 may add the frequency of use of one or more components and the frequency of utilization for development of one or more components and calculate a frequency sum value, and may sequentially set the components as the standard components from the component having a higher order of the calculated frequency sum value.

When the number of one or more standard components included in the component group is larger than the reference number of components, the component management unit 140 may select any one or more standard components among the one or more standard components and delete the selected one or more standard components until the number of one or more standard components reaches the reference number of components. Further, the component management unit 140 may transfer information about the selected one or more standard components stored in the main DB 120 to the sub DB 130. For example, when the number of standard components included in the component group is 5 and the reference number of components is 3, the component management unit 140 may delete two standard components. Further, the component management unit 140 may transfer information about the two deleted standard components from the main DB 120 to the sub DB 130.

In the exemplary embodiment, the component management unit 140 may sequentially delete the standard components from the component having a lower order of the frequency of use. For example, when the frequencies of use of components A to D are 3, 1, 5, and 10, respectively, an order of the deletion of the standard components may be an order of component B, component A, component C, and component D.

In the exemplary embodiment, when the number of one or more standard components included in the component group is larger than the reference number of components, the component management unit 140 may sequentially delete the components from the component having the lower order of the frequency of utilization for development of one or more components. For example, when the frequencies of utilization for development of components A to D are 3, 2, 1, and 0, the component management unit 140 may delete the components A to D in an order of component D, component C, component B, and component A.

In the exemplary embodiment, the component management unit 140 may calculate a frequency sum value by adding the frequency of use of one or more components and the frequency of utilization for development of one or more components, and sequentially delete the components from the component having a lower order of the calculated frequency sum value.

In the exemplary embodiment, when issue information about one or more standard components included in the component group is obtained, the component management unit 140 may delete the one or more standard components, about which the issue information is obtained, regardless of the result of the comparison and the calculated frequency of use.

Herein, the issue information may be information about an issue generated inside or outside one or more standard components. For example, the issue information may include any one or more elements of information about a social issue and an environmental issue generated due to a standard component, discontinuous information about a standard component, and information about a new alternative product of a standard component.

When the component management unit 140 receives any one or more elements of information among the issue information, the component management unit 140 may delete one or more standard components, about which the issue information is obtained, regardless of the result of the comparison and the calculated frequency of use. For example, when the component management unit 140 obtains information indicating that a corresponding standard component for a specific standard component is discontinued, the component management unit 140 may delete the discontinued specific standard component. Hereinafter, a standard component management method by using the standard component managing system 100 according to an exemplary embodiment of the present invention will be described with reference to FIGS. 3 to 5.

Figure 3:
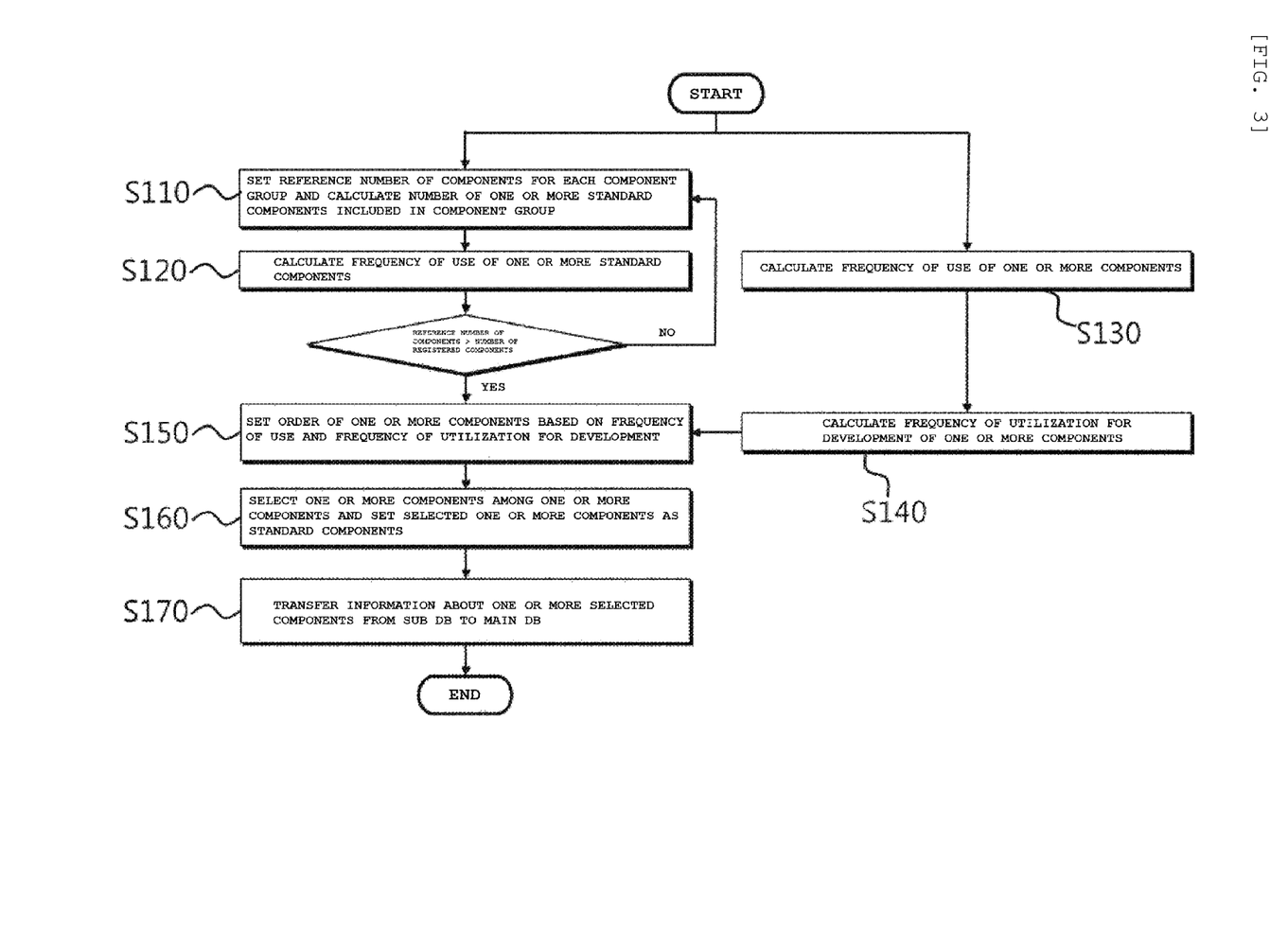
FIG. 3 is a flowchart for describing a series of processes of adding one or more standard components to a component group by using the standard component managing system 100 according to an exemplary embodiment of the present invention.

FIG. 3 is a flowchart for describing a series of processes of adding one or more standard components to a component group by using the standard component managing system 100 according to an exemplary embodiment of the present invention.

Referring to FIG. 3, the standard component managing system sets the reference number of components for each component group, and calculates the number of one or more standard components included in a component group (S110). Further, the standard component managing system calculates the frequency of use of one or more standard components (S120), and calculates the frequency of use of one or more components (S130). Further, the standard component managing system calculates the frequency of utilization for development of one or more components (S140).

Then, when the number of one or more standard components included in the component group is less than the reference number of components, the standard component managing system calculates sets an order of one or more components based on the frequency of use of one or more standard components and the frequency of utilization for development of one or more components calculated in operations S130 and S140 (S150), and sequentially sets any one or more of the one or more components by the amount of standard component shortage as the standard components (S160).

Then, the standard component managing system transfers information about the one or more components selected in operation S160 from a sub database to a main database (S170). Accordingly, when the number of one or more standard components included in the component group is short, the standard component managing system may add the component from the one or more components. In addition, although not illustrated in FIG. 3, the standard component managing system may determine whether the newly added one or more components represent the component group. Herein, when the newly added component does not correspond to the standard component representing the component group, the standard component managing system may delete the corresponding component and replace the corresponding component with another component.

Figure 4:
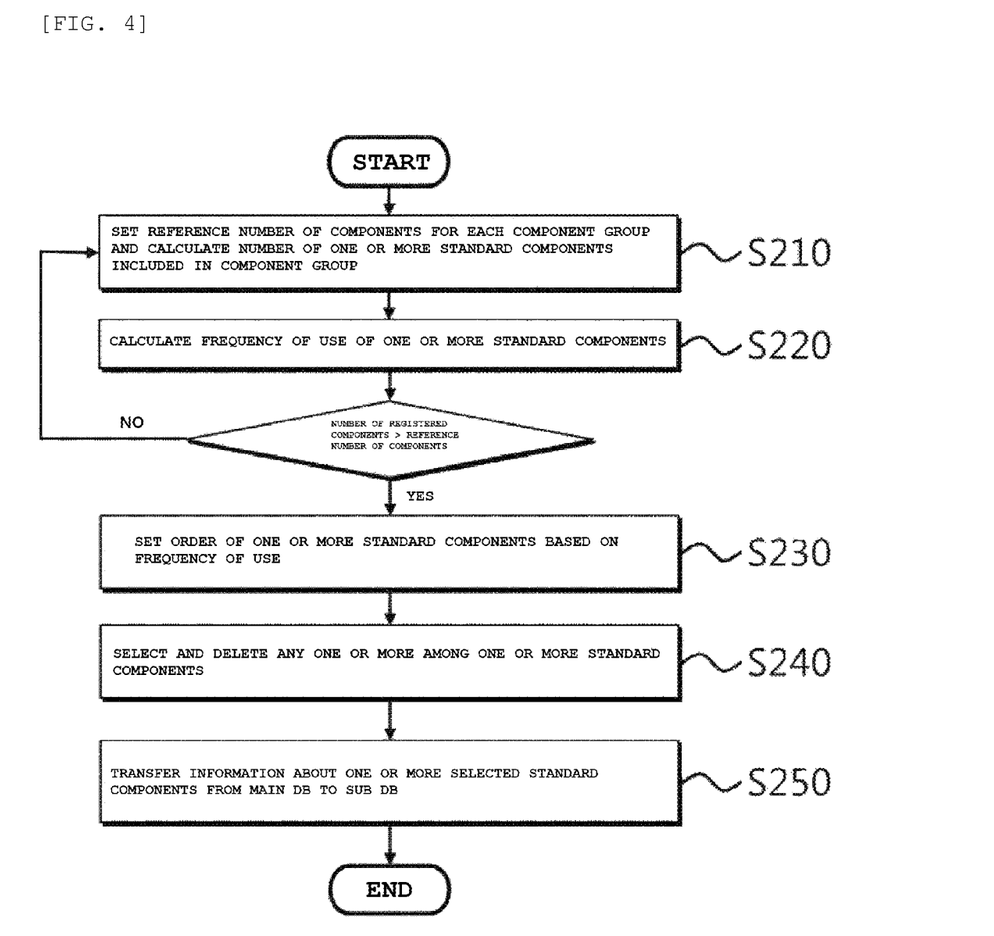
FIG. 4 is a flowchart for describing a series of processes of deleting one or more standard components included in a component group by using the standard component managing system 100 according to an exemplary embodiment of the present invention.

FIG. 4 is a flowchart for describing a series of processes of deleting one or more standard components included in a component group by using the standard component managing system 100 according to an exemplary embodiment of the present invention.

Referring to FIG. 4, the standard component managing system sets the reference number of components for each component group, and calculates the number of one or more standard components included in the component group (S210). Further, the standard component managing system calculates the frequency of use of one or more standard components (S220).

Then, when the number of one or more standard components included in the component group is larger than the reference number of components, the standard component managing system sets an order of the one or more standard components based on the frequency of use calculated in operation S220 (S230), and selects and delete the standard components by the excessive number of standard components (S240).

Then, the standard component managing system transfers information about the one or more selected standard components from the main database to the sub database (S250). Accordingly, when the number of one or more standard components included in the component group is large, the standard component managing system may delete one or more standard component.

Figure 5:
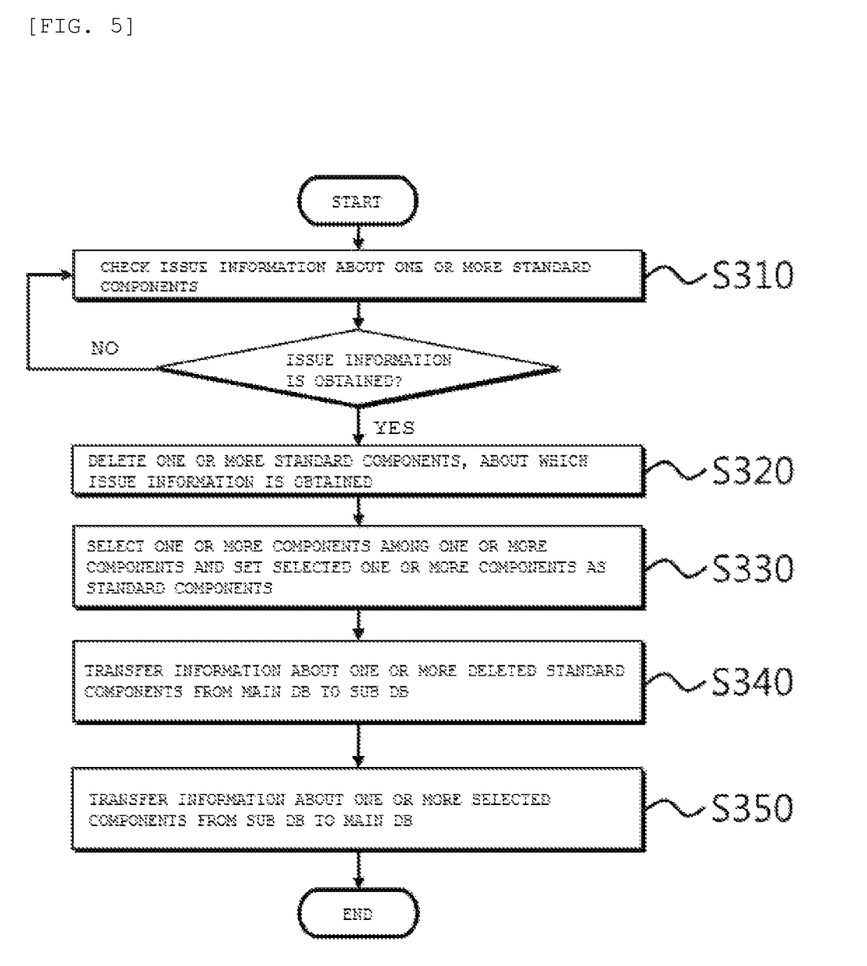
FIG. 5 is a flowchart for describing a series of processes of deleting one or more standard components based on issue information by using the standard component managing system 100 according to an exemplary embodiment of the present invention.

FIG. 5 is a flowchart for describing a series of processes of deleting one or more standard components based on issue information by using the standard component managing system 100 according to an exemplary embodiment of the present invention.

Referring to FIG. 5, the standard component managing system checks issue information about one or more standard components included in the component group (S310).

Then, when issue information about the one or more standard components is obtained, the standard component managing system deletes the one or more standard components, about which the issue information is obtained (S320), and selects any one or more components from one or more components by the deleted number of standard components and sets the one or more selected components as the standard components (S330).

Then, the standard component managing system transfers the information about the one or more standard components deleted in operation S320 from the main database to a sub database (S340), and transfers information about the one or more components selected in operation S330 from the sub database to the main database (S350).

The standard component management method has been described with reference to the flowcharts presented in the drawings. For the simple description, the method is illustrated and described with the series of blocks, but the present invention is not limited to the order of the blocks, and some blocks may occur in the different order from the order illustrated and described in the present specification or may occur with other blocks at the same time, and various other branches, a flow path, and orders of the blocks achieving the same or similar result may be implemented. Further, for the implementation of the method described in the present specification, all of the illustrated blocks may not be required.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A system for managing a standard component using a main database and a substitute database that store information, and which manages a component group including one or more standard components, the system comprising:
   a frequency calculator, which calculates a frequency of use of the one or more standard components included in the component group;
   a component manager, which compares a reference number of standard components that is set for the component group with a registered number of the one or more standard components that are currently included in the component group at every update time of the one or more standard components, and either deletes the one or more standard components currently included in the component group or adds one or more standard components that are includable into the component group based on a result of the comparison and the calculated frequency of use of the one or more standard components currently included in the component group;
   the main database (main DB), which stores and manages information about the one or more standard components currently included in the component group; and
   the substitute database (sub DB), which stores and manages information about one or more components that are includable in the component group,
   wherein when the registered number of the one or more standard components currently included in the component group is less than the reference number of standard components set for the component group, the component manager sets any one or more components among the one or more components of the sub DB as standard components, and transfers information about the set one or more components stored in the sub DB to the main DB, and the main DB updates and stores information about the set one or more components as the one or more standard components currently included in the component group, and wherein the frequency calculator calculates the frequency of use for each of the one or more components, and when determined that the registered number of the one or more standard components currently included in the component group is less than the reference number of standard components set for the component group, the component manager sets up the one or more standard components currently included in the component group in sequential order beginning with a component having a higher order of the calculated frequency of use in updating the main DB.

2. The system of claim 1, wherein when the registered number of the one or more standard components currently included in the component group is larger than the reference number of standard components, the component manager deletes any one or more standard components among the one or more standard components currently included in the component group and transfers the information about the deleted one or more standard components stored in the main DB to the sub DB.

3. The system of claim 2, wherein when the registered number of the one or more standard components currently included in the component group is larger than the reference number of standard components, the component manager sequentially deletes any one or more the standard components from the one or more standard component currently included in the component group and having a lower order of the calculated frequency of use.

4. The system of claim 1, wherein when issue information about the one or more standard components currently included in the component group is obtained, the component manager deletes the one or more standard components, about which the issue information is obtained, regardless of the comparison result and the calculated frequency of use.

5. The system of claim 1, wherein the information about the one or more standard components includes any one or more of a type of the standard components, a model name of the standard components, a specification of the standard components, a product code of the standard components, an update time of the standard components, the frequency of use of the standard components, an issue history generated of the standard components, a discontinuousness history of the standard components, and new model release information of the standard components.

6. A method of managing one or more standard components included in a component group by using a standard component management system including a main database and a substitute database, the method comprising:

calculating a frequency, by a frequency calculator, in which a frequency of use of the one or more standard components included in the component group is calculated;

comparing component numbers, by a component manager, in which a reference number of standard components set for the component group is compared with a registered number of the one or more standard components that are currently included in the component group at every update time of the one or more standard components;

managing, by the component manager, in which the one or more standard components currently included in the component group are deleted from the component group or the one or more standard components that are includable into the component group are added to the component group based on a result of the comparison and the calculated frequency of use of the one or more standard components currently included in the component group;

storing and managing information about the one or more standard components currently included in the component group in a main database (main DB); and storing information about one or more components includable in the component group in a substitute database (sub DB) and managing the information about the one or more components, wherein the managing by the component manager includes, when the registered number of the one or more standard components currently included in the component group is less than the reference number of standard components set for the component group, setting any one or more components among the one or more components of the Sub DB as standard components, and the storing of the information in the sub DB and the managing of the information includes transferring information about the set one or more components stored in the sub DB to the main DB, and the main DB updates and stores information about the set one or more components as the one or more standard components currently included in the component group, and wherein the calculating of the frequency includes calculating a frequency of use of each of the one or more components, and the managing of the component further includes, and when determined that the number of one or more standard components currently included in the component group is less than the reference number of standard components set for the component group, setting up the one or more standard components currently included in the component group in sequential order beginning with a component having a higher order of the calculated frequency of use in updating the main DB.

7. The method of claim 6, wherein the managing of the component includes, when the registered number of the one or more standard components currently included in the component group is larger than the reference number of standard components, deleting any one or more standard components among the one or more standard components currently included in the component group, and the storing of the information in the main DB and the managing of the information includes transferring information about the deleted one or more standard components stored in the main DB to the sub DB.

8. The method of claim 7, wherein the managing of the component further includes, when the number of one or more standard components included in the component group is larger than the reference number of standard components, sequentially deleting the any one or more standard components from the one or more standard component currently included in the component group and having a lower order of the calculated frequency of use.

9. The method of claim 6, wherein the managing of the component includes, when issue information about the one or more standard components currently included in the component group is obtained, the managing of the component includes deleting the one or more standard components, about which the issue information is obtained, regardless of the comparison result and the calculated frequency of use.

10. The method of claim 6, wherein the information about the one or more standard components includes any one or more of a type of the standard components, a model name of the standard components, a specification of the standard components, a product code of the standard components, an update time of the standard components, the frequency of use of the standard components, an issue history generated of the standard components, a discontinuousness history of the standard components, and new model release information of the standard components.

* * * * *